United States Patent
Nakagawa et al.

(10) Patent No.: US 7,139,934 B2
(45) Date of Patent: Nov. 21, 2006

(54) STORAGE SYSTEM FOR INCREASED CACHE RELIABILITY VIA READING REDUNDANT DISKS INTO CACHE

(75) Inventors: Yutaka Nakagawa, Yokohama (JP); Akira Nishimoto, Sagamihara (JP); Naoto Matsunami, Hayamamachi (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 10/857,112

(22) Filed: May 28, 2004

(65) Prior Publication Data

US 2005/0240854 A1 Oct. 27, 2005

(30) Foreign Application Priority Data

Apr. 22, 2004 (JP) ............................. 2004-126666

(51) Int. Cl.
*G06F 11/00* (2006.01)
(52) U.S. Cl. ................. 714/6; 714/41; 714/42; 711/112
(58) Field of Classification Search ............. 714/6, 714/41; 711/112
See application file for complete search history.

(56) References Cited

U.S. PATENT DOCUMENTS

| | | | |
|---|---|---|---|
| 6,269,424 | B1 | 7/2001 | Katsuragi et al. |
| 6,625,748 | B1 | 9/2003 | Tanaka et al. |
| 2002/0038436 | A1 | 3/2002 | Suzuki |
| 2002/0055972 | A1* | 5/2002 | Weinman ..................... 709/203 |
| 2002/0188800 | A1* | 12/2002 | Tomaszewski et al. ...... 711/112 |
| 2003/0033572 | A1* | 2/2003 | Walton et al. ............... 714/763 |
| 2003/0236919 | A1 | 12/2003 | Johnson et al. |
| 2004/0010661 | A1 | 1/2004 | Katsuragi et al. |
| 2005/0050383 | A1* | 3/2005 | Horn et al. ..................... 714/6 |
| 2005/0188257 | A1* | 8/2005 | Morita ........................ 714/13 |

FOREIGN PATENT DOCUMENTS

JP 10-247133 9/1998

OTHER PUBLICATIONS

David A. Patterson, et al., "A Case for Redundant Arrays of Inexpensive Disks (RAID)", Computer Science Division, 1988 ACM 0-89791-268-3/88/0006/0109.
Mario Blaum, et al. "Evenodd: An Optimal Scheme for Tolerating Double Disk Failures in RAID Architectures". IBM Almaden Research Center, 1063-6897/94 1994 IEEE.

* cited by examiner

*Primary Examiner*—Scott Baderman
*Assistant Examiner*—David Gentry
(74) *Attorney, Agent, or Firm*—Townsend and Townsend and Crew LLP

(57) ABSTRACT

A storage system includes a group of storage devices which include back-up devices configured to assure appropriate response time. When a data request from a host computer arrives, and the number of failed devices has changed as shown by a device state management table, a determination is made regarding the number of devices from which to read data. This determination is made based on an indication of redundancy which indicates how many of the disk devices are allowed to be in a failed state at the time of data reading. Typically, the indication of redundancy is determined by the sum of the number of failed devices and a predetermined number. The determined number of devices are selected in accordance with a selection factor, and a selection result is written into a disk management table. Then, the reading process is executed with respect to the target disk devices.

25 Claims, 14 Drawing Sheets

FIG. 6

| | LU0 | LU1 | LU2 | LU3 | ... |
|---|---|---|---|---|---|
| DISK STRUCTURE | 0-5 | 6-11 | 12-17 | 18-23 | ... |
| MAXIMUM REDUNDANCY | 2 (PARITY) | 3 (PARITY) | 2 (PARITY) | 2 (MIRROR) | ... |
| READING REDUNDANCY | 1 | 2 | 1 | 0 | ... |
| SELECTION FACTOR | LOW COMPUTATIONAL COMPLEXITY | LOW COMPUTATIONAL COMPLEXITY | LOAD DISTRIBUTION | - | ... |

READ DISK MANAGEMENT TABLE 127

| LU0 | d0 | d1 | d3 | _d4_ | d5 |
|-----|-----|-----|-----|-----|-----|
| LU1 | d6 | d7 | d8 | _d9_ | _d10_ |
| LU2 | d12 | d14 | d15 | d16 | _d17_ |
| LU3 | d18 | | | | |
| ⋮ | ⋮ | ⋮ | | | | |

FIG. 7B

| YOW | REQUESTED DATA | READING REDUNDANCY | FAILED DISK | | | | | |
|-----|-----|-----|-----|-----|-----|-----|-----|-----|
| a | D1 (d1) | 0 | - | d1 | | | | |
| b0 | D0 | 0 | d1 | d0 | | | | |
| b1 | D1 | 0 | d1 | d0 | d2 | d3 | _d4_ | |
| b2 | D2 | 0 | d1 | d2 | | | | |
| b3 | D3 | 0 | d1 | d3 | | | | |
| c | D0, D1, D2 OR D3 | 1 | - | d0 | d1 | d2 | d3 | _d4_ |
| d | " | 1 | d2 | d0 | d1 | d3 | _d4_ | _d5_ |
| e | " | 1 | d2, d3 | d0 | d1 | _d4_ | _d5_ | |
| f | " | 2 | - | d0 | d1 | d2 | d3 | _d4_ | _d5_ |
| g | " | 2 | d2 | d0 | d1 | d3 | _d4_ | _d5_ |
| h | D00 (d18) | 0 | - | d18 | | | | |
| i | " | 1 | - | d18 | _d20_ | | | |
| j | " | 1 | d18 | d20 | _d22_ | | | |
| k | " | 1 | d19 | d18 | _d20_ | | | |
| l | " | 1 | _d20_ | d18 | _d22_ | | | |
| m | " | 2 | - | d18 | _d20_ | _d22_ | | |
| n | " | 2 | d19 | d18 | _d20_ | _d22_ | | |
| o | " | 2 | d18, d19 | _d20_ | _d22_ | | | |

\* dXX DENOTES DISK DEVICE STORING REDUNDANT DATA

| LU0 | | | | | | |
|---|---|---|---|---|---|---|
| DISK d0 | DISK d1 | DISK d2 | DISK d3 | DISK d4 | DISK d5 | |
| D0 | D1 | D2 | D3 | P0-3 | Q0-3 | |
| D4 | D5 | D6 | D7 | P4-7 | Q4-7 | |
| D8 | D9 | D10 | D11 | P8-11 | Q8-11 | |
| D12 | D13 | D14 | D15 | P12-15 | Q12-15 | |
| ... | ... | ... | ... | ... | ... | |
| D4n | D4n+1 | D4n+2 | D4n+3 | P4n-(4n+3) | Q4n-(4n+3) | |

| LU3 | | | | | |
|---|---|---|---|---|---|
| DISK d18 | DISK d19 | DISK d20 | DISK d21 | DISK d22 | DISK d23 |
| D100 | D101 | M100 | M101 | M'100 | M'101 |
| D102 | D103 | M102 | M103 | M'102 | M'103 |
| D104 | D105 | M104 | M105 | M'104 | M'105 |
| ... | ... | ... | ... | ... | ... |

| DISK d0 | DISK d1 | DISK d2 | DISK d3 | DISK d4 | DISK d5 |
|---------|---------|---------|---------|---------|---------|
| D0 | D1 | D2 | D3 | P0-3 | Q0-3 |
| Q4-7 | D4 | D5 | D6 | D7 | P4-7 |
| P8-11 | Q8-11 | D8 | D9 | D10 | D11 |
| D15 | P12-15 | Q12-15 | D12 | D13 | D14 |
| ⋮ | ⋮ | ⋮ | ⋮ | ⋮ | ⋮ |

STORAGE SYSTEM FOR INCREASED CACHE RELIABILITY VIA READING REDUNDANT DISKS INTO CACHE

CROSS-REFERENCES TO RELATED APPLICATIONS

This application relates to and claims priority from Japanese Patent Application No. 2004-126666, filed on Apr. 22, 2004, the entire disclosure of which is incorporated herein by reference.

BACKGROUND OF THE INVENTION

The present invention relates to a storage system including a plurality of storage devices with the interrelationship established thereamong for data recovery, and a data reading method and a data reading program regarding the same.

A storage system recently developed is a type operating a plurality of magnetic disk devices in parallel, so that a data reading/writing process requested by a host is increased in speed, and the reliability is improved with the redundant structure. Such a storage system is generally referred to as RAID (Redundant Arrays of Inexpensive Disks). The RAID structure varies in level, i.e., level 1 to level 5, details of which are described in Non-patent Document 1 below.

In Non-patent Document 2, described is another type of RAID structure derived by expanding the RAID structure of level 4 of Non-patent Document 1. The RAID structure is the one offering a guarantee of data storage even if any two disk devices fail. Specifically, for guaranteeing as such, used are two types of parity data: one is parity data as a calculation result of exclusive OR of data stored in the respective storage devices forming a logical unit; and the other is parity data as a calculation result of exclusive OR of data and a multiplied value of the other parity data and a specific coefficient.

In the storage system, other than a Fibre Channel disk device, an ATA (AT attachment) disk device is getting popular. The problem is that an ATA disk device is lower in cost than a Fibre Channel disk device, but also lower in reliability and thus fails easily. Thus, it is highly possible that any two disk devices fail at the same time, i.e., double failure occurs. Moreover, the capacity per disk device has been steadily increasing, resulting in longer time taken for data recovery in any failed disk device utilizing the RAID technology. Thus, even if any high-reliable disk devices are in use, the possibility of double failure remains high. In consideration thereof, as the technology of Non-patent Document 2, measures to be taken against multiple failures will become increasingly important from now on.

In Patent Document 1, described is a storage system offering a guarantee of response time with respect to a data request coming from a host even if any failure occurs to disk devices. With this storage system, no matter if any failure is occurring to disk devices, any other data needed for recovering the requested data is always read in parallel. Even if reading of the requested data does not work, the requested data is favorably recovered without newly reading redundant data from the disk devices.

Herein, Non-patent Document 1 is "a Case for Redundant Arrays of Inexpensive Disks (RAID)" authored by D. Patterson, proceedings of the 1988 ACM SIGMOD international conference ON Management of data, PP. 109 to 116, 1988.

Non-patent Document 2 is "EVENODD: an Optimal Scheme for Tolerating Double DISK Failures in RAID Architectures" authored by M. Blaum, Proceedings of the 21st Annual International Symposium ON Computer Architecture, PP. 245 to 254, 1994.

Further, Patent Document 1 is JP-A-10-247133.

SUMMARY OF THE INVENTION

With the recent information-oriented society, expectations are growing for multimedia-capable disk array apparatuses. Considered here is a system for distributing moving images and audio. In the system, responding to a request coming from a client, a distribution server reads large amount of data such as moving images and audio from a storage system, and the resulting data is forwarded to the client.

The problem with such a system is that any delay occurring to data reading will result in quality degradation of moving images and audio. Thus, the storage system is required to offer a guarantee of the maximum response time to the distribution server. In terms of response time, the technology of Non-patent Document 2 has a problem of longer response time with any failed disk device. To be specific, although the technology is adaptable for any two failed disk devices, if reading of any requested data is not completed, the disk devices are accessed again for reading of redundant data, and from the redundant data, the requested data is recovered to make a response to the server.

With the technology of Patent Document 1, the response time with any failed disk device can be shorter than the technology of Non-patent Document 2. This is because parallel data reading is always done to data needed to recover the requested data no matter if any disk device is in failure. The problem here is that, however, also the data needed to recover the requested data is always a reading object, resulting in the larger amount of data for reading. As a result, even with no failed disk device, the response time will be longer than necessary due to factors such as data bus and cache memory. Especially if the technologies of Patent Document 1 and Non-patent Document 2 are used together, a plurality pieces of redundant data are to be read together with the requested data, resulting in much larger amount of data for reading. Thus, the response time takes much longer.

Therefore, in consideration of such problems of the conventional technologies, an object of the present invention is to provide a storage system capable of guaranteeing a response time of a certain degree not too slow, and a data reading method and a data reading program regarding the same.

To solve the above problems, the present invention is directed to a first storage system.

The first storage system includes a plurality of storage devices, and cache memory for temporarily storing data in the storage devices, and the storage devices, not entirely but at least excluding one disk device, store data to be accessed from the outside, and the excluded disk device stores one or more redundant data used for recovering the data. Alternatively, the disk devices may each independently store the data to be accessed from the outside and one or more redundant data.

In such a storage system, a controller is provided for performing data reading from any of the storage devices for storage into the cache memory in response to a data request coming from the outside before transferring the data to the outside.

The controller goes through a redundancy determination step of determining, as an actual reading redundancy, how many of the storage devices are allowed to be failed for data recovery at the time of data reading in accordance with a predetermined factor to determine the number of redundant data corresponding to the actual reading redundancy, and a reading step of, in response to a data request coming from the outside, reading data in request from any of the storage devices and the number of redundant data determined in the redundancy determination step, and storing the resulting data to the cache memory.

To solve the above problems, the present invention is directed to a second storage system, according to the first storage system, a device state management table is included for storing information that indicates whether the storage devices are all available for data reading.

The controller determines whether the storage devices are all available for data reading, and then stores a determination result to the device state management table.

In the redundancy determination step, based on the determination result stored in the device state management table as the predetermined factor telling how many of the storage devices are not available for data reading, determines the actual reading redundancy.

To solve the above problems, the present invention is directed to a third storage system, according to the second storage system, a corresponding redundancy table is included for storing information that indicates a reading redundancy telling how many of the storage devices are still allowed to be failed for data recovery based on the information stored in the device state management table.

In the redundancy determination step, based on the reading redundancy stored in the corresponding redundancy table, and the number of storage devices not available for data reading stored in the device state management table, the actual reading redundancy is determined.

To solve the above problems, the present invention is directed to a fourth storage system, according to any one of the first to third storage systems, the controller goes through a corresponding redundancy change step of changing the reading redundancy stored in the corresponding redundancy table in accordance with an instruction coming from the outside.

To solve the above problems, the present invention is directed to a fifth storage system, according to any one of the first to fourth storage systems, a maximum redundancy table is included for storing a maximum redundancy that indicate show many of the storage devices, at the maximum, are allowed to be failed for data-recovery.

In the redundancy determination step, as the actual reading redundancy, a value is set to be equal to or less than the maximum redundancy stored in the maximum redundancy table.

To solve the above problems, the present invention is directed to a sixth storage system. The sixth storage system includes a plurality of storage devices, and cache memory for temporarily storing the data in the storage devices, and the storage devices, not entirely but at least excluding one storage device, store data to be accessed from the outside, and the excluded storage device stores one or more redundant data used for recovering the data. Alternatively, the storage devices may each independently store the data to be accessed from the outside and one or more redundant data.

In such a storage system, a controller is provided for performing data reading from any of the storage devices for storage into the cache memory in response to a data request coming from the outside before transferring the data to the outside.

The controller goes through a redundancy determination step of determining how many of the redundant data, none or one or more, is to be provided in accordance with a predetermined factor, and a reading step of, in response to a data request coming from the outside, reading the requested data from any of the storage devices and the number of redundant data determined in the redundancy determination step, and storing the resulting data to the cache memory.

Further, the number of redundant data is determined in the redundancy determination step in the respective storage systems at at least one timing of when the controller is through with data writing or reading to/from the storage devices, when data writing or reading is through to/from the storage devices from the outside, when any failure occurs to a component(s) of the storage systems, when power is turned on, or when a data request comes from the outside. Herein, when a redundant data selection step is included for selection of the redundant data in accordance with the selection factor of the redundant data, the number of redundant data may be determined at a timing of when the selection factor is changed.

To solve the above problems, the present invention is directed to a seventh storage system. The seventh storage system includes a plurality of storage devices with the interrelationship established thereamong for data recovery, and cache memory for temporarily storing the data in the storage devices. One or more of the storage device store one or more redundant data, or each of the storage devices stores one or more redundant data.

Such a storage system includes redundancy determination means for determining, as an actual reading redundancy, how many of the storage devices are allowed to be failed for data recovery at the time of data reading, and then determining the number of storage devices storing the redundant data corresponding to the actual reading redundancy, data reading means for, in response to a data request coming from the outside, reading data in request from any of the storage devices and the redundant data from the number of storage devices determined by the operation of the redundancy determination means, and storing the resulting data to the cache memory, data recovery means for, when the requested data is not stored in the cache memory in the operation of the data reading means responding to the data request coming from the outside, recovering the requested data using the redundant data stored in the cache memory for storage into the cache memory, and data transfer means for transferring, to the outside, the requested data stored in the cache memory.

To solve the above problems, the present invention is directed to an eighth storage system. The eighth storage system includes a plurality of storage devices, and cache memory for temporarily storing the data in the storage devices, and the storage devices, not entirely but at least excluding one storage device, store data to be accessed from the outside, and the excluded storage device stores one or more redundant data used for recovering the data. Alternatively, the storage devices may each independently store the data to be accessed from the outside and one or more redundant data.

In such a storage system, a controller is provided for performing data reading from any of the storage devices for storage into the cache memory in response to a data request coming from the outside before transferring the data to the outside.

The controller goes through a redundancy data selection step of selecting any of the redundant data in accordance with a predetermined factor, a reading step of, in response to a data request coming from the outside, reading data in request from any of the storage devices and the redundant data determined in the redundancy data selection step, and storing the resulting data to the cache memory.

To solve the above problems, the present invention is directed to a ninth storage system, according to the eighth storage system, the predetermined factor is, at least one of the manageability of data recovery using the redundant data, the uniformizing a usage of a data transfer path from the respective storage devices to the cache memory, and the following an instruction coming from the outside.

To solve the above problems, the present invention is directed to a tenth storage system to be accessed by a host computer.

The storage system includes one or more of a first storage device storing data to be accessed by the host computer, one or more of a second storage device, when any of the first storage devices fails, storing redundant data for use of recovering the data stored in the failed first storage device, and a controller for making an access to the data stored in the first storage device(s) and the data stored in the second storage device(s).

The controller includes cache memory for temporarily storing the data stored in the first and second storage devices.

The controller determines, in response to an access request from the host computer, how many of the second storages are to be subjected to reading of the redundant data depending on how many of the first storage devices are in failure. Then, the controller performs data reading from any of the first storage devices and the determined number of second devices for storage into the cache memory. Out of the data thus stored in the cache memory, only the data requested from the host computer for data access is forwarded to the host computer.

To solve the above problems, the present invention is directed to a data reading method in the first storage system.

The storage system includes a plurality of storage devices, and cache memory for temporarily storing data in the storage devices. The storage devices, not entirely but at least excluding one storage device, store data to be accessed from the outside, and the excluded storage device stores one or more redundant data used for recovering the data. Alternatively, the storage devices may each independently store the data to be accessed from the outside and one or more redundant data.

In the data reading method in such a storage system, the following steps are executed. That is, a redundancy determination step of determining an actual reading redundancy that indicates how many of the storages are allowed to be failed for data recovery at the time of data reading based on a predetermined factor, and determining how many of the redundant data is to be provided corresponding to the actual reading redundancy, a reading step of, in response to a data request coming from the outside, reading the data in request from any of the storage devices and the redundant data for the number determined in the redundancy determination step for storage into the cache memory, a data recovery step of, when the data requested from the outside is not stored in the cache memory in the reading step, recovering the requested data using the redundant data stored in the cache memory, and storing the recovered requested data into the cache memory, and a data transfer step of transferring the requested data stored in the cache memory to the outside.

To solve the above problems, the present invention is directed to a data reading method of the second storage system, according to the data reading method of the first storage system, a device state determination step is executed for determining whether the storage devices are all available for data reading, and storing a determination result to a device state management table. In the redundancy determination step, the actual reading redundancy is determined based on the device state management table telling how many of the storage devices are not available for data reading as the predetermined factor.

To solve the above problems, the present invention is directed to a data reading method of the third storage system, according to the data reading method of the second storage system, a corresponding redundancy storage step is included for storing, into a corresponding redundancy table, a reading redundancy indicating how many of the storage devices are still allowed to be failed for data recovery based on the information stored in the device state management table.

In the redundancy determination step, the actual reading redundancy is determined based on the reading redundancy stored in the corresponding redundancy table, and the number of storage devices not available for data reading stored in the device state management table.

To solve the above problems, the present invention is directed to a data reading method of the fourth storage system, including a plurality of storage devices, and cache memory for temporarily storing data in the storage devices, and the storage devices, not entirely but at least excluding one storage device, store data to be accessed from the outside, and the excluded storage device stores one or more redundant data used for recovering the data. Alternatively, the storage devices may each independently store the data to be accessed from the outside and one or more redundant data.

In the data reading method of such a storage system, the following steps are executed. That is, a redundancy data selection step of selecting any of the redundant data in accordance with a predetermined factor, a reading step of, in response to a data request coming from the outside, reading data in request from any of the storage devices and the redundant data determined in the redundancy data selection step for storage into the cache memory, a data recovery step of, when the data requested from the outside is not stored in the cache memory in the reading step, recovering the requested data using the redundant data stored in the cache memory, and storing the recovered requested data to the cache memory, and a data transfer step of transferring the requested data stored in the cache memory to the outside.

To solve the above problems, the present invention is directed to a data reading program of the first storage system. The storage system includes a plurality of storage devices, and cache memory for temporarily storing data in the storage devices. The storage devices, not entirely but at least excluding one storage device, store data to be accessed from the outside, and the excluded storage device stores one or more redundant data used for recovering the data. Alternatively, the storage devices may each independently store the data to be accessed from the outside and one or more redundant data.

In the data reading program in such a storage system, the following steps are executed by a computer. That is, a redundancy determination step of determining, as an actual reading redundancy, how many of the storage devices are allowed to be failed for data recovery at the time of data reading, and determining the number of redundant data corresponding to the actual reading redundancy, a reading step of, in response to a data request coming from the outside, reading the requested data from any of the storage devices and the number of redundant data determined in the redundancy determination step for storage into the cache memory, a data recovery step of, when the data requested from the outside is not stored in the cache memory in the reading step, recovering the requested data using the redundant data stored in the cache memory, and storing the recovered requested data to the cache memory, and a data transfer step of transferring the requested data stored in the cache memory to the outside.

To solve the above problems, the present invention is directed to a data reading program of the second storage system. The storage system includes a plurality of storage devices, and cache memory for temporarily storing data in the storage devices. The storage devices, not entirely but at least excluding one storage device, store data to be accessed from the outside, and the excluded storage device stores one or more redundant data used for recovering the data. Alternatively, the storage devices may each independently store the data to be accessed from the outside and one or more redundant data.

In the data reading program in such a storage system, the following steps are executed by a computer. That is, a redundancy data selection step of selecting any of the redundant data in accordance with a predetermined factor, a reading step of, in response to a data request coming from the outside, reading the requested data from any of the storage devices and the redundant data determined in the redundancy data selection step for storage into the cache memory, a data recovery step of, when the data requested from the outside is not stored in the cache memory in the reading step, recovering the requested data using the redundant data stored in the cache memory, and storing the recovered requested data to the cache memory, and a data transfer step of transferring the requested data stored in the cache memory to the outside.

According to the present invention, the number of redundant data is changed depending on the circumstances. Accordingly, a guarantee can be offered to a response time of a certain degree without delaying the response time that much.

BRIEF DESCRIPTION OF THE DRAWINGS

FIG. 6 is an illustrative diagram showing an exemplary structure of a redundant structure management table of the embodiment;

FIGS. 7A and 7B are each a diagram showing the read disk management table of the embodiment, and specifically, FIG. 7A is an illustrative diagram showing an exemplary structure of the read disk management table, and FIG. 7B is an illustrative diagram showing the change of read disks depending on various requirements;

FIG. 8 is an illustrative diagram showing the structures of LU0 and LU3 of the embodiment;

FIG. 9 is an illustrative diagram showing the structures of another LU;

DESCRIPTION OF THE EMBODIMENT

In the below, described is a storage system in an embodiment of the present invention by referring to the accompanying drawings.

Figure 1:
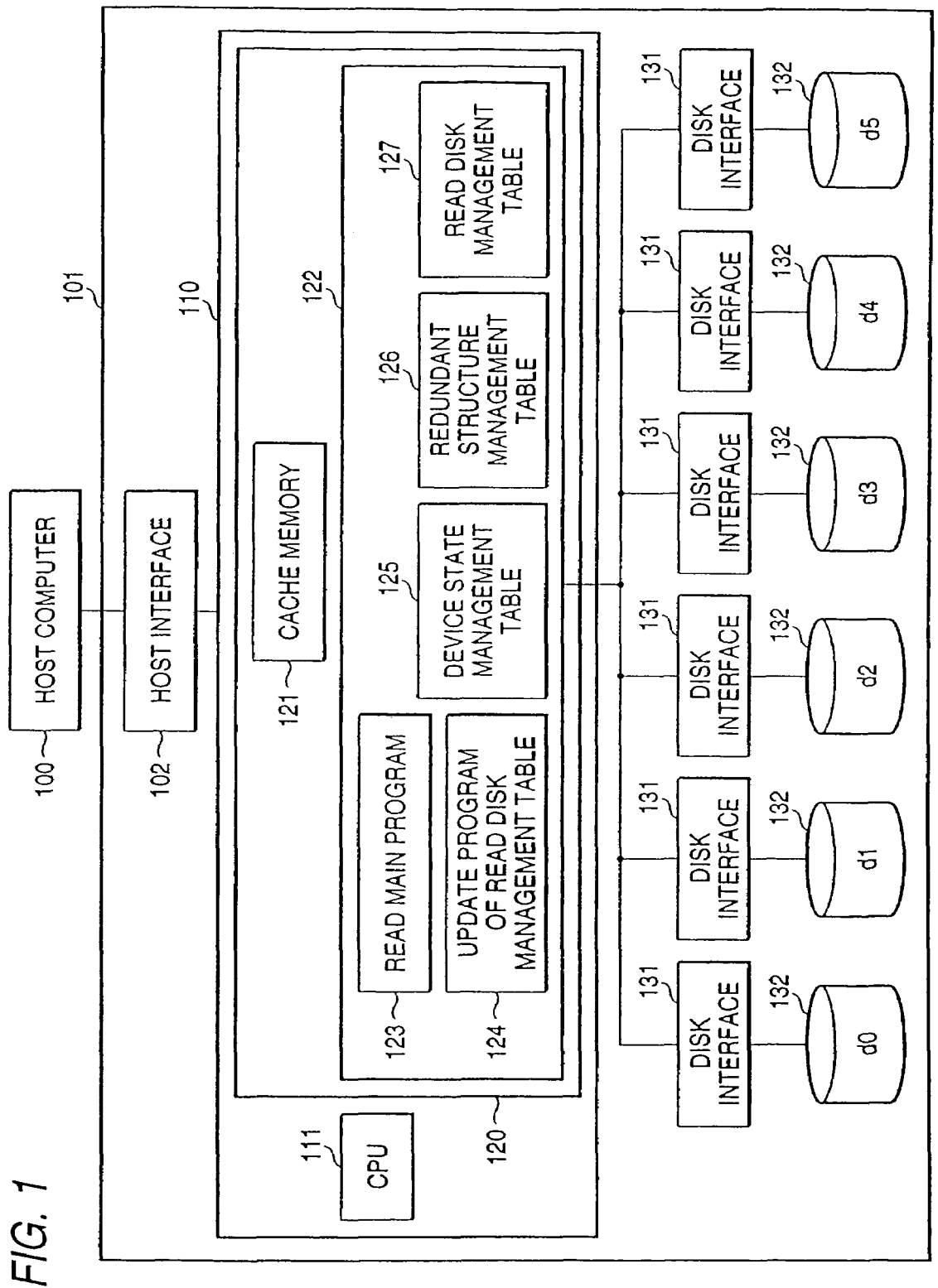
FIG. 1 is an illustrative diagram showing an exemplary structure of a storage system of an embodiment of the present invention.

As shown in FIG. 1, a storage system 101 of the present embodiment is connected to a host computer 100. The storage system 101 is provided with a host interface 102 for data transmission and reception with the host computer 100, a plurality of disk devices 132, a plurality of disk interfaces 131 for exercising drive control over the respective disk devices 132, and a controller 110 for exercising control over the respective disk interfaces 131.

The controller 110 includes a CPU 111 for executing various programs, and a memory section 120 for storing data read from the disk devices 132, the programs to be executed by the CPU 111, and others. The memory section 120 includes cache memory 121 for temporarily storing the data read from the disk devices 132, and local memory 122 for storing the programs to be executed by the CPU 111, various data, and others. The local memory 122 includes a read main program 123, an update program 124, a device state management table 125, a structure information management table 126, and a read disk management table 127. Specifically, the read main program 123 is for the CPU 111 to go through the flows of FIGS. 2 and 3, and the update program 124 is for the CPU 111 to go through the flow of FIG. 4 to update a read disk management table. The device state management table 125 stores information in what state the disk devices 132 are, and the structure information management table 126 stores information needed for exercising redundant control. The read disk management table 127 stores information which disk is to be accessed at the time of actual data reading.

Figure 5:
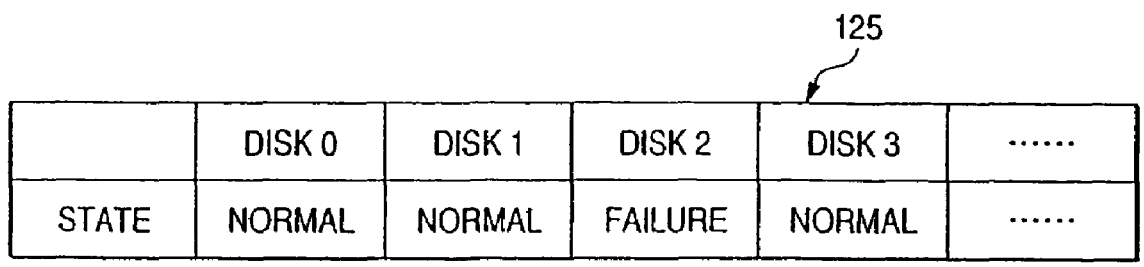
FIG. 5 is an illustrative diagram showing an exemplary structure of a device state management table of the embodiment.

By referring to FIG. 5, the device state management table 125 stores state information for every disk ID of the respective disk devices 132. The information stands for the disk device is in a normal state, failure state, under recovery, or not used not used. Here, the normal state means that the disk devices 132 are available for data reading. The failure state means when the disk devices 132 are not available for data reading due to failure occurring thereto, and whenever the controller 110 cannot perform data reading from the disk devices 132 due to failure occurring to the disk interfaces 131 or the data transfer path, for example.

By referring to FIG. 6, the redundant structure management table 126 stores information about every LU (Logical Unit), which is operated by the host computer 100 as a logical disk unit. In the present embodiment, there are a plurality of LUs, i.e., LU0, LU1, LU2, LU3, . . . . The information about each LU includes various rows 126a to 126d. Specifically, the row 126a stores the disk structure indicating IDs of the disk devices 132 structuring the corresponding LU. The row 126b stores the maximum redundancy indicating the maximum number of disk devices allowed to fail yet to recover the data in the corresponding LU. The row 126c stores the corresponding redundancy at the time of reading (hereinafter, reading redundancy) indicating how many more disk devices are allowed to fail at the time of data reading yet to recover the data in the corresponding LU based on the information stored in the device state management table 125. The row 126d stores a selection factor for the disk devices 132. Note here that if any of the disk devices 132 belonging to the same LU fails, the data in other disk devices 132 of the same LU is available to recover the data having stored in the failed disk device. Accordingly, even if any failure occurs to the disk devices 132 in the same LU, the LU data can be recovered as long as the number of failed disk devices 132 is equal to the maximum redundancy.

In the present embodiment, as shown in the row 126a of the disk structure, the LU0 is structured by the disk devices 132 having disk IDs of 0 to 5, the LU1 is structured by the disk devices 132 having disk IDs of 6 to 11, the LU2 is structured by the disk devices 132 having disk IDs of 12 to 17, and the LU3 is structured by the disk devices 132 having disk IDs of 18 to 23. Further, as shown in the row 126b of the maximum redundancy, the LU0 has the maximum redundancy of 2, the LU1 has the maximum redundancy of 3, the LU2 has the maximum redundancy of 2, and the LU3 has the maximum redundancy of 2. In the row 126b, the parentheses indicate the type of the redundant data, and in this example, the type includes parity data and mirror data. The row 126c of the reading redundancy stores values from 0 to the maximum redundancy. The row 126c of the selection factor stores "low calculation complexity (manageability of data recovery)", "load distribution", "under instructions", and "–". Specifically, "low calculation complexity" denotes decrease of calculation amount at the time of data recovery through selection of redundant data, and "load distribution" denotes usage equalization of data transfer path between the disk devices 132 and the cache memory 121. Further, "under instruction" denotes following external instructions coming from the host computer 100, a controller of the storage system 101, a monitoring device, and others, and "–" denotes that no selection factor is provided for the LU. The values in the row 126c indicating the reading redundancy, and the selection factors in the row 126d can be updated responding to instructions coming from the host computer 100.

By referring to FIG. 7A, the read disk management table 127 stores IDs of the disk devices 132, those of which are supposed to be subjected to data reading (hereinafter, such disk devices are referred to as target disk devices). Such storage is done responding to a data reading request issued on an LU basis for data stored in the disk devices 132. Exemplifying a case where a reading request is issued for data in any of disk devices d0 to d5 structuring the LU0, the read disk management table 127 shows that data reading is expected to be done from the disk devices d0, d1, and d3 to d5. The read disk management table 127 is updated by going through the flow of FIG. 4, which will be described later.

Described now is an exemplary LU data structure by referring to FIG. 8.

By taking the LU0 as an example, the disk d0 is assigned with stripes D0, D4, D8, D12, . . . , the disk d1 with stripes D1, D5, D9, D13, . . . , the disk d2 with stripes D2, D6, D10, D14, . . . , and the disk d3 with stripes D3, D7, D11, D15, . . . . That is, in this example, data storage is regularly done in order from the disk device d0 to d3, i.e., in order of stripes D0, D1, D2 . . . .

Moreover, the disk device d4 in the LU0 is assigned with parities P0-3, P4-7, P8-11, P12-15, . . . , and the disk device d5 therein is assigned with parities Q0-3, Q4-7, Q8-11, Q12-15, . . . . The parity P0-3 is redundant data derived by exclusive OR calculation of data retained by the stripes D0 to D3, and this is applicable to the parities P4-7, P8-11, and others. The parity Q0-3 is redundant data derived from the stripes D0 to D3 and the parity P0-3 using a calculation equation of Non-patent Document 2, and this is applicable to the parities Q4-7, Q8-11, and others.

As such, as to the LU0, the two disk devices d4 and d5 both store the parities P and Q, respectively. Accordingly, even if any two, at the maximum, of the disk devices d0 to d5 structuring the LU0 are failed, data having stored in the failed disk devices can be successfully recovered. This means, as described above with the redundant structure management table 126, that the LU0 has the maximum redundancy of 2.

In this example, although the number of parities P and Q is coinciding with the value of the maximum redundancy for one stripe, this is not always true. Depending on the exclusive OR equation structure, even if a stripe has three parities, the maximum redundancy may be 2.

Further, the disk devices storing the parities P and Q in the above example are all fixed. Alternatively, those may be variable as the RAID structure of level 5. To be specific, as shown in FIG. 9, the parities P and Q may be distributed among the disk devices for storage regularly in order.

Still further, although data redundancy is achieved by parities in the above example, mirror may be used for the purpose as the LU3 of FIG. 8. In the LU3, a disk device d18 in the LU3 is assigned with stripes D100, D102, D104, . . . , and a disk device d19 therein with stripes D101, D103, D105, . . . . Moreover, a disk device d20 structuring the LU3 is assigned with mirrors M100, M102, M104, . . . , a disk device d22 with mirrors M'100, M'102, M'104, . . . , a disk device d21 with mirrors M101, M103, M105, . . . , and a disk device d23 is assigned with mirrors M'101, M'103, M'105, . . . . That is, in this example, a piece of stripe D100 is provided with two mirrors M100 and M'100 as a copy result of data of the stripe D100.

Accordingly, even if any two, at the maximum, of the disk devices d18 to d23 structuring the LU3 are failed, data having stored in the failed disk devices can be successfully recovered. This means, as described above with the redundant structure management table 126, that the LU3 has the maximum redundancy of 2.

As such, in the present invention, data redundancy is not restrictively achieved only by parities, but any method will do as long as redundancy is achieved.

By referring to the flowcharts of FIGS. 2 to 4, described next is the operation of the storage system described above at the time of data reading.

Figure 2:
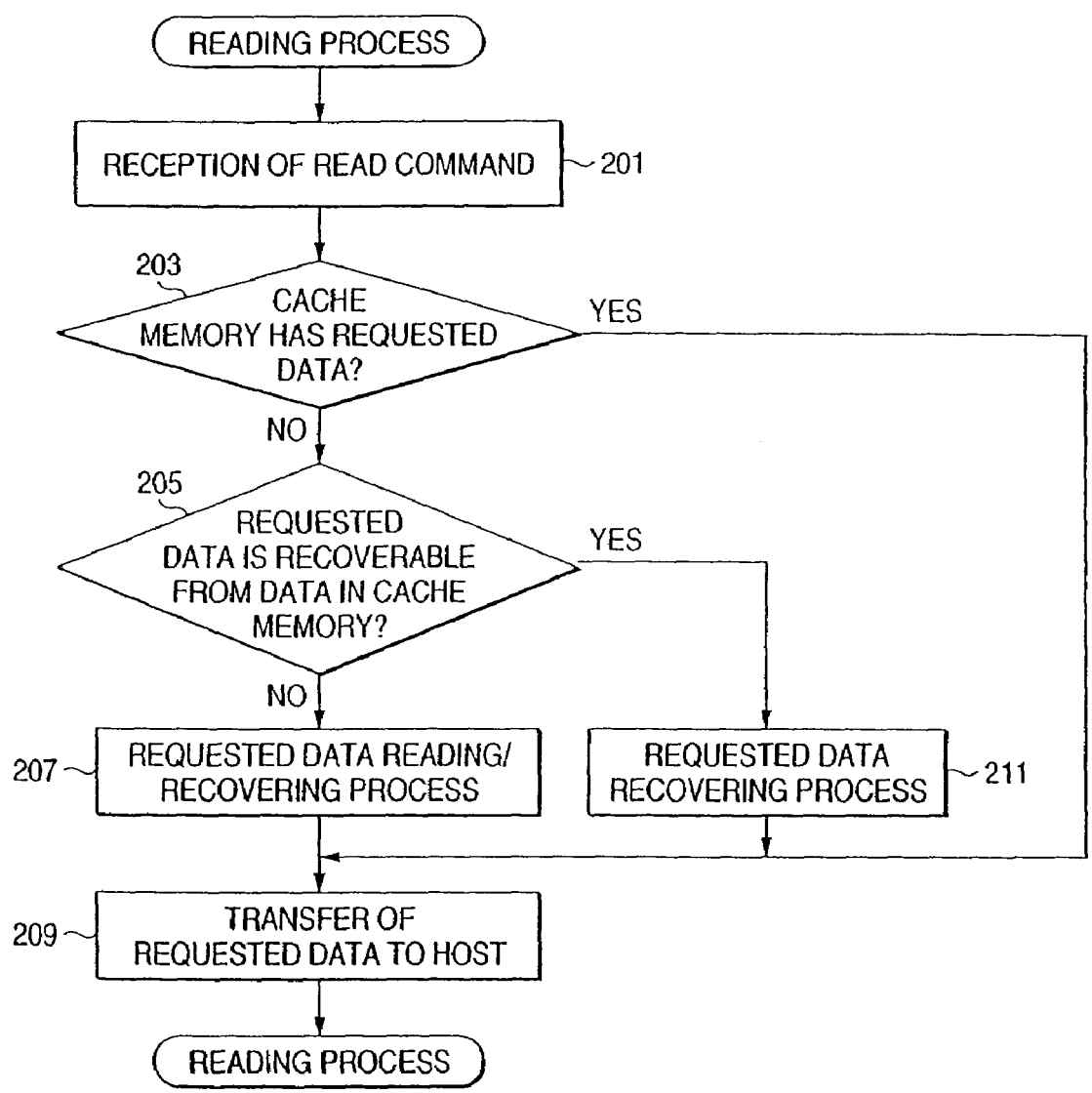
FIG. 2 is a flowchart of an exemplary reading process in the storage system of the embodiment responding to a reading request coming from a host computer.

First, by referring to the flowchart of FIG. 2, described is the operation of the CPU 111 at the time of executing the read main program 123 stored in the local memory 122.

Upon reception of a READ command from the host computer 100 (step S201), the CPU 111 of the controller 110 first checks whether the cache memory 121 is having data in request (step 203). If not having, the CPU 111 then checks whether the requested data is recoverable from redundant data (parity data or mirror data) located in the cache memory 121, i.e., whether the cache memory 121 is having any data needed for data recovery including redundant data (step 205). If the cache memory 121 has no such redundant data, and if the requested data is not recoverable, the CPU 111 first goes through a request data reading/recovering process that will be described later with reference to FIG. 3 (Step 207). Then, the CPU 111 forwards the requested data to the host computer 100 (step 209). On the other hand, if the cache memory 121 has such redundant data in need, and if the requested data is recoverable in step 205, the CPU 111 uses the redundant data to go through a process to recover the requested data. Then, thus recovered data is stored in the cache memory 121 (step 211) prior to transferring the requested data to the host computer 100 (step 209). In such a recovery process (step 211), to use parity data as redundant data, e.g., to recover the data stored in the stripe D0 of the LU0 of FIG. 8, the data having stored in the stripes D1 to D3 is used together with the parity P0-3 or Q0-3. As to the data in the stripe D100 of the LU3 of FIG. 8, when the cache memory 121 carries data of mirror M100 being its redundant data, data transfer (step 209) is immediately carried out. This is because the data of mirror M100 is data of the stripe D100.

Further, when the requested data is found in the cache memory 121 in step 203, the CPU 111 forwards the requested data to the host computer 101 (step 209). In this transfer process, if transfer does not work due to any failure occurring between the controller 110 and the host computer 100, and if the CPU 111 or the host interface 102 detects such a failure, the retry operation may be carried out as required.

Note that, in the above, the redundant data and others in the cache memory 121 are used in step 205 to check whether or not the data is recoverable. In an alternative manner, the procedure may skip step 205 and go directly to step 207. Further, the data amount to be read in step 207 is not specifically defined. Alternatively, the data may be in the minimum amount needed to be recovered, or may vary in amount for the purpose of capability improvement by look-ahead, for example. Further, in step 209, the CPU 111 goes through the transfer process for the requested data. Alternatively, the CPU 111 may simply forwards a data transfer instruction to the host interface 102, and based thereon, the host interface 102 may accordingly perform data transfer.

Figure 3:
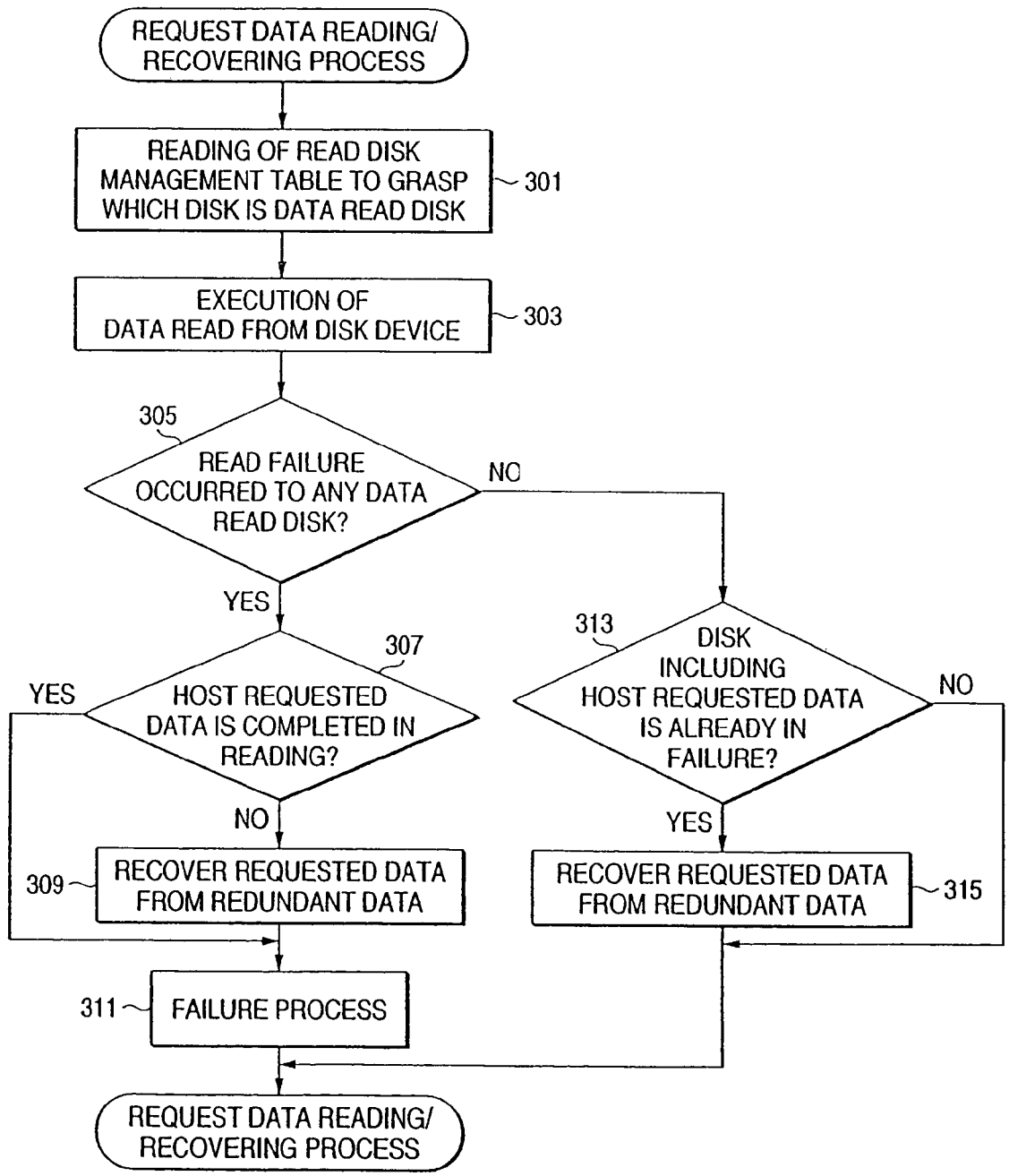
FIG. 3 is a flowchart of an exemplary process of step 207 of FIG. 2.
Figure 4:
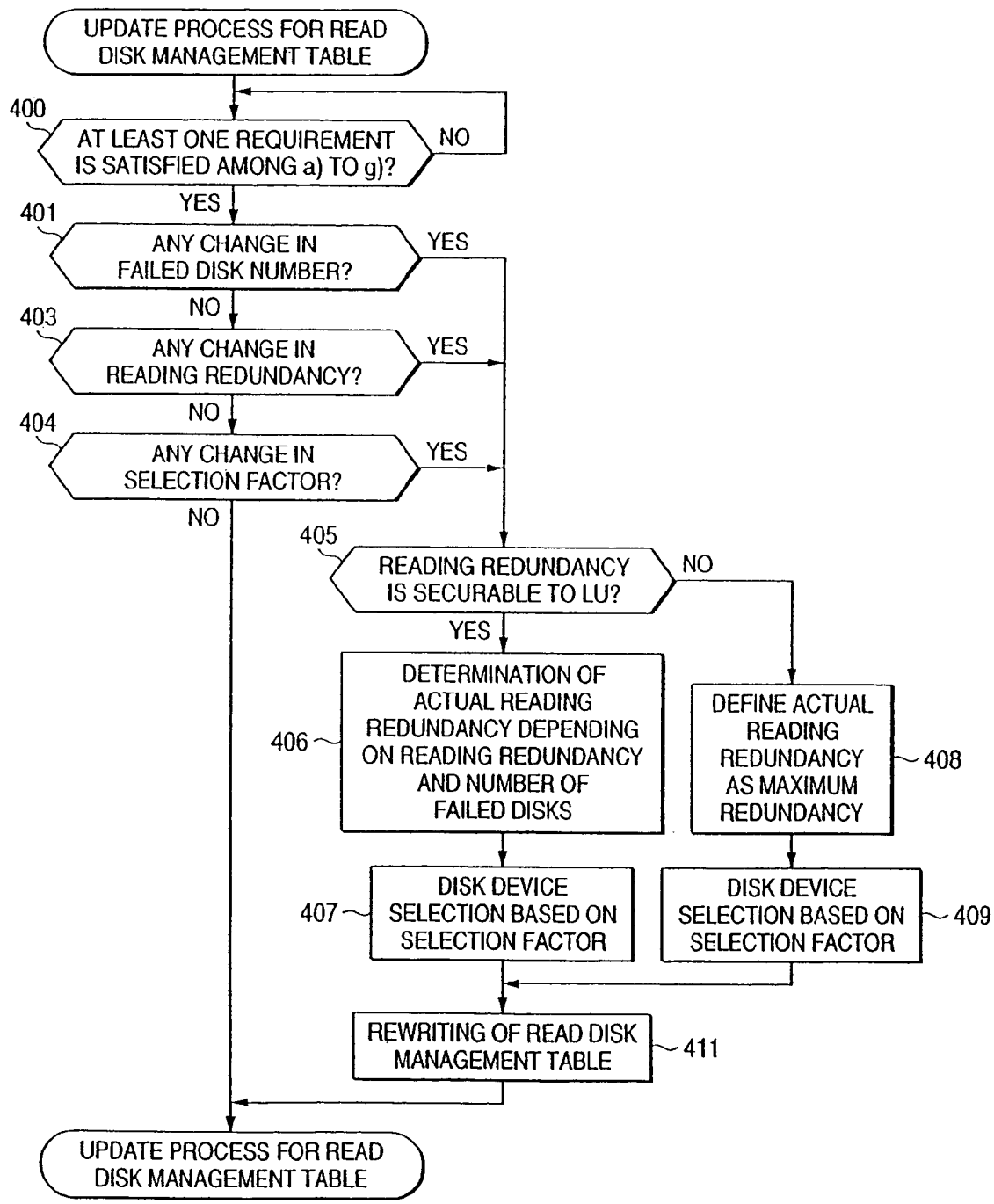
FIG. 4 is a flowchart of an exemplary update process in the storage system of the embodiment executed to update a read disk management table.

By referring to the flowchart of FIG. 3, the requested data reading/recovering process (step 207) is described in more detail.

The CPU 111 first refers to the read disk management table 127 of FIG. 7, i.e., the row for the LU storing the requested data, to see which disk device(s) are to be subjected to data reading (step 301). Assuming if requested is data of the stripe D1 stored in the disk d0, as shown in FIG. 7A, the row for the LU0 storing data of the stripe D1 is referred to see that the disk devices d0, d1, d3, d4, and d5 are target disk devices. In this example, these disk devices are derived by the fact that the disk device d2 is already in failure, and the reading redundancy is 1. Herein, dx denotes a disk device storing the redundant data. Then, these target disk devices are subjected to data reading, and any data derived thereby is stored into the cache memory 121 (step 303).

During such data reading (step 303), the CPU 111 checks whether one or more target disk devices are completed with data reading based on any failure occurrence to the disk device(s) (step 305). To determine whether data reading is through or not, used is a determination factor whether an error response comes from the disk interfaces 131, or whether data reading is through within a predetermined length of time. If any of the disk devices are not through with data reading, the CPU 111 then checks whether the requested data has been completely read from the host computer 100 (step 307). If not yet completed, the requested data is subjected to a recovery process using the data and redundant data read from other disk devices. The resulting requested data is stored into the cache memory 121 (step 309). In this data recovery process, for example, data of the stripe D1 stored in the disk d1 is in request, and if data reading does not work from the disk device d1 having stored such data, the data of the disk device d1 is recovered using data stored in other disk devices d0, d3, d4, and d5 having been through with data reading.

After the data recovery process is through (step 309), the CPU 111 goes through a failure process (step 311), and this is the end of the requested data reading/recovering process. In a case where the data requested by the host computer is through in step 307, the failure process is immediately executed (step 311), and then the requested data reading/recovering process is ended. In the failure process (step 311), the target disk devices are subjected to data reading again, or an error response is made toward the host computer 100. Further, in the device state management table 125 of FIG. 5, the disk device(s) determined as failed in data reading in step 305 are denoted by "failure".

Further, in step 305, when every target disk device has been through with data reading, the CPU 111 checks whether the disk device including the data requested from the host computer is already in failure, i.e., whether the requested data is successfully read (step 313). This is because if the disk device including the requested data is failed at the time of data reading, it means that the disk device(s) found in step 301 include no such disk device including the requested data. Thus, even if determined in step 305 that data reading is completely through with every target disk device, the requested data is not yet read. To be specific, this is an insurance against such a case that the disk device d2 is already in failure but a data request for the stripe D2 stored therein comes. If this is the case, data in the disk devices d0, d1, d3, d4, and d5 are available for data reading, but the requested data is not available due to the failed disk device d2.

When the disk device including the requested data is already in failure in step 313, i.e., when the requested data is not yet read, the requested data is recovered using the data and the redundant data read out from other disk devices. The resulting requested data is stored into the cache memory 121 (step 315), and this is the end of the requested data reading/recovering process. When the requested data is already through in step 313, on the other hand, the requested data reading/recovering process is immediately ended.

Note that, in step 309, when the requested data is not recoverable due to not enough redundant data, the procedure may immediately go to the failure process (step 311) to try again reading of the targeted disk devices, or make an error response to the host computer 100.

By referring to the flowchart of FIG. 4, described next is the operation of the CPU 111 when executing the update program 124 for the read disk management table 127 stored in the local memory 122.

The CPU 111 first determines whether at least one of seven requirements is satisfied (step 400). Here, the seven requirements include: a) when the CPU 111 is through with data writing or reading to/from a plurality of disk devices 131; b) when the host computer 100 is completed with data writing or reading to/from the storage system 101; c) when any failure occurs to a component(s) structuring the storage system 101; d) when the storage system 101 is turned on; e) when the reading redundancy of the redundant structure management table 126 (FIG. 6) is changed through external operation; f) when a data request comes from the host computer 100; and g) when a selection factor is changed for the disk device 132.

When determined that at least one of the requirements a) to g) is satisfied, the CPU 111 refers to the disk state management table 125 (FIG. 5) to see whether the number of failed disk devices is changed (step 401). Also, the CPU 111 refers to the redundant structure management table 126 (FIG. 6) to see whether the reading redundancy is changed (step 403), and whether a selection factor is changed for the disk device 132 (step 404).

When determined in steps 401, 403, and 404 that no change is observed for the number of failed disk devices, the reading redundancy, and the disk selection factor, the procedure is ended without updating the read disk management table 127. When determined in steps 401, 403, and 404 that some change is observed for the number of failed disk devices, the reading redundancy, or the disk selection factor, the reading redundancy of the applicable LU is read from the redundant structure management table 126 to see whether the reading redundancy is retainable (step 405). If retainable, the disk devices structuring the LU are checked to see how many of those are failed. Based on thus derived number and the reading redundancy, an actual reading redundancy, i.e., the number of redundant data to be actually read, is determined (step 406).

Here, by referring to FIG. 7B, such a determination to be made for the reading redundancy is described in more detail. The actual reading redundancy denotes, as already described above, the number of disk devices whose data is yet recoverable even if failed based on the information in the device state management table 125, and the actual reading redundancy denotes the number of disk devices whose data is recoverable even if failed at the time of data reading.

As shown in a row a of FIG. 7B, with the LU0, when the reading redundancy is 0, and the number of failed disk devices is 0, data recovery is not necessarily done at the time of data reading. Thus, at the time of data reading, there is no need to make an access to the disk devices d4 and d5 storing the redundant data, and the reading redundancy becomes 0, in other words, the number of redundant data to be read at the time of data reading becomes 0. Similarly, as shown in a row $b_1$ of FIG. 7B, even if the reading redundancy is 0, when only the disk device d1 is in failure and when a reading request is issued for the data D1 stored in the failed disk device d1, there needs to make an access to the disk devices d0 and d2 to d4 storing data needed to recover the redundant data and the data D1 in the failed disk device d1 at the time of data reading. Accordingly, the actual reading redundancy will be 1, in other words, the number of redundant data to be read at the time of data reading will be 1. Herein, as shown in the rows $b_0$, $b_2$, and $b_3$ in the same drawing, the reading redundancy is 0, and the actual reading redundancy of a case where the disk device including the requested data is not in failure is 0. In other words, only the disk device including the requested data is to be accessed. Further, as shown in a row d of the same drawing, when the reading redundancy is 1, and when the number of failed disk devices d2 is 1, there needs to make an access to the disk devices d4 and d5 including the redundant data at the time of data reading while recovering the data of the failed disk device d2. This is to be ready for data recovery of any disk device that may happen to be newly failed. Accordingly, the actual reading redundancy will be 2, in other words, the number of redundant data to be read at the time of data reading will be 2.

As such, described is an exemplary case where parity data is used as redundant data. When mirror data is used as redundant data, as shown in a row h in FIG. 7B, as for the LU3, when the reading redundancy is 0, and when the number of failed disk drives is 0, it means that no data recovery is required at the time of data reading. Accordingly, there is no need to make an access at the time of data reading to the disk devices d20 to d23 having stored the redundant data, and the actual reading redundancy will be 0, in other words, the number of mirror data is 0 as the redundant data to be read at data reading. Further, as shown in a row i in the same drawing, when the reading redundancy is 1, and when the number of failed disk devices is 0, there needs to make an access to the disk device d20 having stored the mirror data at the time of data reading as redundant data. This is to be ready for data recovery of any disk device that may happen to be newly failed. Accordingly, the actual reading redundancy will be 1, in other words, the number of redundant data to be read at the time of data reading will be 1.

Here, in step 405, determination factors whether the reading redundancy can be secured are the value of the maximum redundancy stored in the row 126b of the redundant structure table 126 (FIG. 6), the value of the reading redundancy stored in the row 126c of the table 126, and the number of failed disk devices stored in the device state management table 125 (FIG. 5). For example, as shown in the row d of FIG. 7B, when the reading redundancy is 1, and when only the disk device d2 is in failure, the actual reading redundancy will be 2. As the LU0 has the maximum redundancy of 2, and the actual reading redundancy of 2 is equal to or smaller than the maximum redundancy 2, it is known that the actual reading redundancy is applicable. In other words, the reading redundancy can be secured to be 1. The issue here is that, as shown in a row e of the same drawing, when the LU0 has the reading redundancy of 1, and the disk devices d2 and d3 are in failure, the actual reading redundancy is supposed to be 3. However, as the maximum redundancy of the LU0 is 2, the actual reading redundancy of 3 is not applicable. That is, the reading redundancy of 1 cannot be secured.

As such, when the reading redundancy cannot be secured, the CPU 111 sets the actual reading redundancy to the maximum redundancy no matter what value the reading redundancy has (step 408). For example, in the case of the row e of FIG. 7B, even if the reading redundancy is 1, the actual reading redundancy is equalized to the maximum redundancy, i.e., 2.

Once determined the actual reading redundancy as such (steps 406, 408), the CPU 111 refers to the redundant structure management table 126 (FIG. 6) for the selection factor to select which disk device 132 is to be actually read (steps 407, 409). Assuming that the value of the actual reading redundancy and the value of the maximum redundancy are the same, e.g., both values are 1, it means that only one disk device is storing the redundant data. As such, there is no choice but to select thus available disk device. On the other hand, when the maximum redundancy is larger than the actual reading redundancy, e.g., the reading redundancy of 1, and the maximum redundancy is 2 or larger, it means that two or more disk devices are storing the redundant data, and available for selection.

In view thereof, in the present embodiment, when two or more disk devices are available for selection, the selection factor is used as a basis for disk device selection. In the present embodiment, as shown in FIG. 6, the selection factors include "low calculation complexity (facility of data recovery)", "load distribution (usage equalization of data transfer path)", and "under instructions".

Considered now is the case where the actual reading redundancy is 1 and the maximum redundancy is 2 with the dual parity structure of Non-patent Document 2. With the structure of FIG. 8 including disks, data, and parities as such, using first redundant data P stored in the disk device d4 will reduce the calculation load at the time of data recovery than using second redundant data Q stored in the disk device d5. As a specific example, considered is the case where the disk device d0 fails at the time of reading of the data D0. To recover the data D0 using the redundant data P0-3, exclusive OR calculation is executed for D1, D2, D3, and P0-3. On the other hand, to recover the data D0 using the redundant data Q0-3, P0-3 is first derived through calculation of exclusive OR of a value derived by multiplying a specific coefficient to D1, D2, D3, and P0-3. Then, the data D0 is recovered through calculation of exclusive OR of D1, D2, D3, and P0-3. In this case, compared with the case of using the parity P0-3, using the parity Q0-3 increases the calculation amount by the amount to derive the parity P0-3. If this is the case, if the selection factor is "low calculation complexity", selected is not the disk device d5 storing the redundant data Q0-3 but the disk device d4 storing the redundant data P0-3. As such, if the calculation amount for data recovery changes depending on which redundant data is to be used, with "low calculation complexity" set to the selection factor, selected is the disk device for reading the redundant data with which calculation amount is reduced based on the RAID structure.

Figure 14:
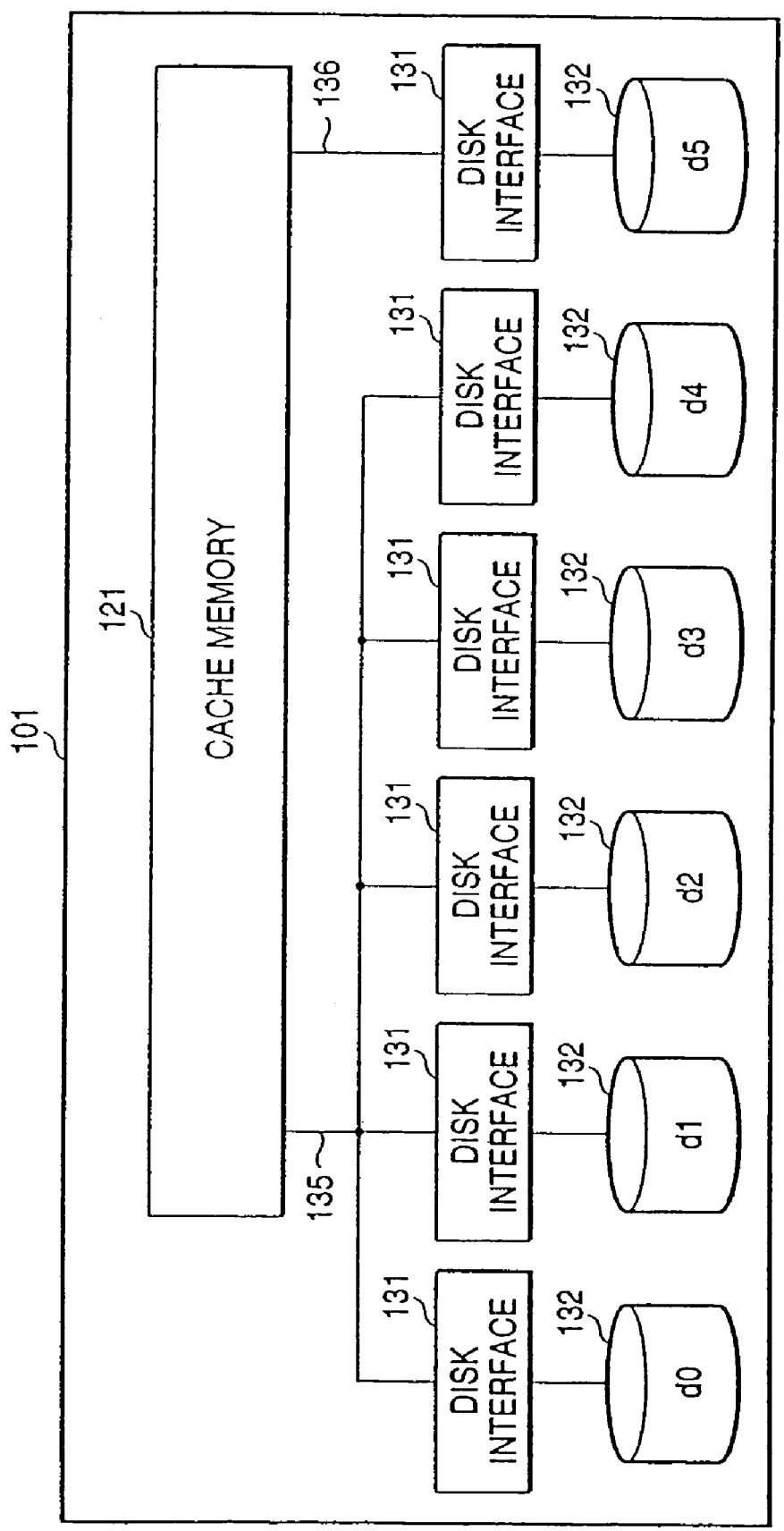
FIG. 14 is a diagram showing an exemplary structure of a storage system.

Further, in the case as above as reducing the calculation amount using the redundant data P, the time taken to transfer the redundant data. Q becomes considerably shorter than the transfer time of other data, and the eventual response time against the host computer 100 will be shorter even if the calculation load is relatively large. Specifically, this happens when the data transfer path from the disk device d4 storing the first redundant data P to the cache memory 121 is partially or entirely shared by the data transfer path for the disk devices other than the disk device d5 that stores the second redundant data Q, and when the disk device d5 solely uses another transfer path. Referring to FIG. 14, such a case is described. The disk devices d0 to d4 share a transfer path 135, and the disk device d5 solely uses a transfer path 136. To use the redundant data P, data transferring takes time to cover the disk devices d0 to d4. To use the redundant data Q, on the other hand, data transferring takes time to cover the disk devices d0 to d3, or the disk device d5, whichever longer due to two different transfer paths. Assuming that the transfer paths 135 and 136 have the same data transfer speed, the transfer time with the redundant data Q stored in the disk device d5 will be 0.8 times of that with the redundant data P in the disk device d4. An addition result of such a time difference and a difference of time to recover the redundant data will be a difference of host response time. As such, when the transfer path varies, and when the sum of the data transfer time and transfer path usage vary, with "load distribution" set to the selection factor, selected is the disk device d5 storing the redundant data Q. Here, the sum of the data transfer time, and the transfer path usage are not restricted to be determined by the wavelength or frequency of the transfer path, but by the capability of a controller exercising control over data transfer, capability of components locating on the transfer path, and others.

After completion of disk device selection as such, the CPU 111 goes through rewriting of the read disk management table 127 (step 411), and this is the end of the update process for the read disk management table.

As described in the foregoing, in the present embodiment, the actual reading redundancy, i.e., the number of redundant data at the time of data reading, is changed depending on how many disk device(s) are in failure. Accordingly, without delaying that much the response time for data request from the host computer 100, a guarantee can be offered for the response time. Moreover, in the present embodiment, when disk device selection is allowed, the selection is made based on a predetermined selection factor. Thus, the response time can be shorter to a greater degree.

By referring to FIGS. 10 to 13, effects of the present invention are described in more detail.

Figure 10:
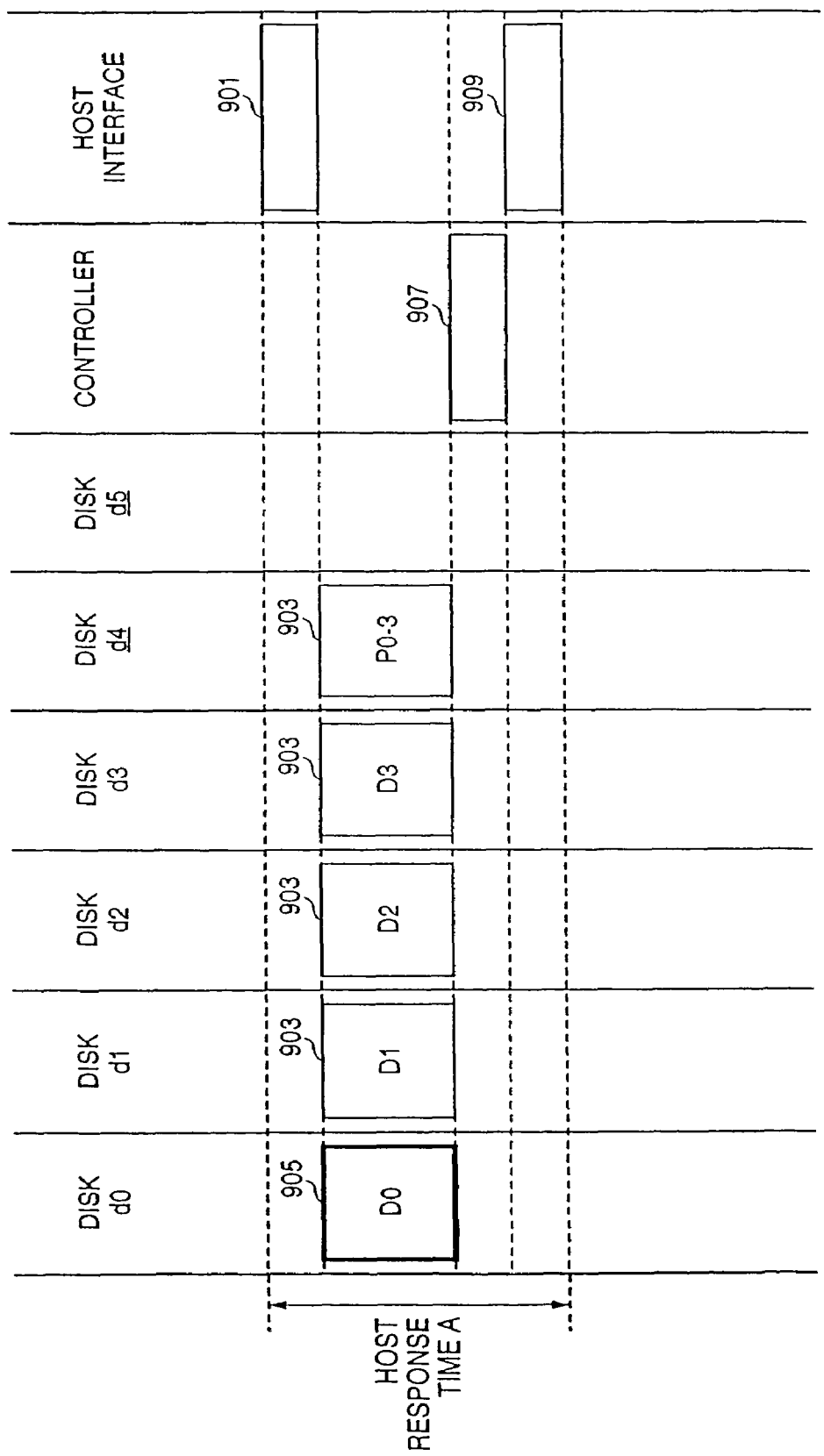
FIG. 10 is an exemplary timechart showing a host response time in the storage system of the embodiment.

First, referring to FIG. 10, described is the host response time of a case where the reading redundancy of the LU0 is set to 1 in the storage system 101 of the present embodiment. Presumably, the disk device d0 is already in failure without being known, and thus no data is available for reading from the disk device d0.

When a request comes from the host computer 100 for the data of the stripe D0 in the LU0, the host interface 102 and the controller 110 responsively go through a reception process for the duration of a time 901. The controller 110 refers to the read disk management table 127 to see which disk device(s) are to be subjected to data reading, and then executes a reading process against thus found target disk devices. Herein, presumably, none of the disk devices d0 to d5 structuring the LU0 is in failure before reading, and thus when the reading redundancy is 1, the target disk devices are d0, d1, d2, d3, and d4. Accordingly, the controller 110 applies the reading process to these disk devices d0 to d4. The reading process takes a time 905 for the disk device d0, and a time 903 for the disk devices d1 to d4. The reading process time 905 includes a time period until the disk device d0 is found as having been failed, and the reading process time 903 includes a time period until the data D1, D2, D3, and P1-3 are all stored in the cache memory 121.

In this example, the redundant data P0-3 in the disk device d4 is completely read at this reading process, and thus there is no need to read again the redundant data P0-3 stored in the disk device d4 after detecting the disk device d0 in failure.

Using the data D1, D2, D3, and P0-3 stored in the cache memory 121, the controller 110 takes a time 907 to recover the data of the stripe D0 in the disk device d0, which is failed in data reading. Thus recovered data is stored into the cache memory 121. The controller 110 and the host interface 102 forward the requested data to the host computer 100 for the duration of a time 909.

As a result, a response time A against the data request from the host computer 100 will be the sum of the reception process time 901, the reading process time 905 or 903 (whichever longer), the recovery time 907, and the transfer time 909.

Figure 11:
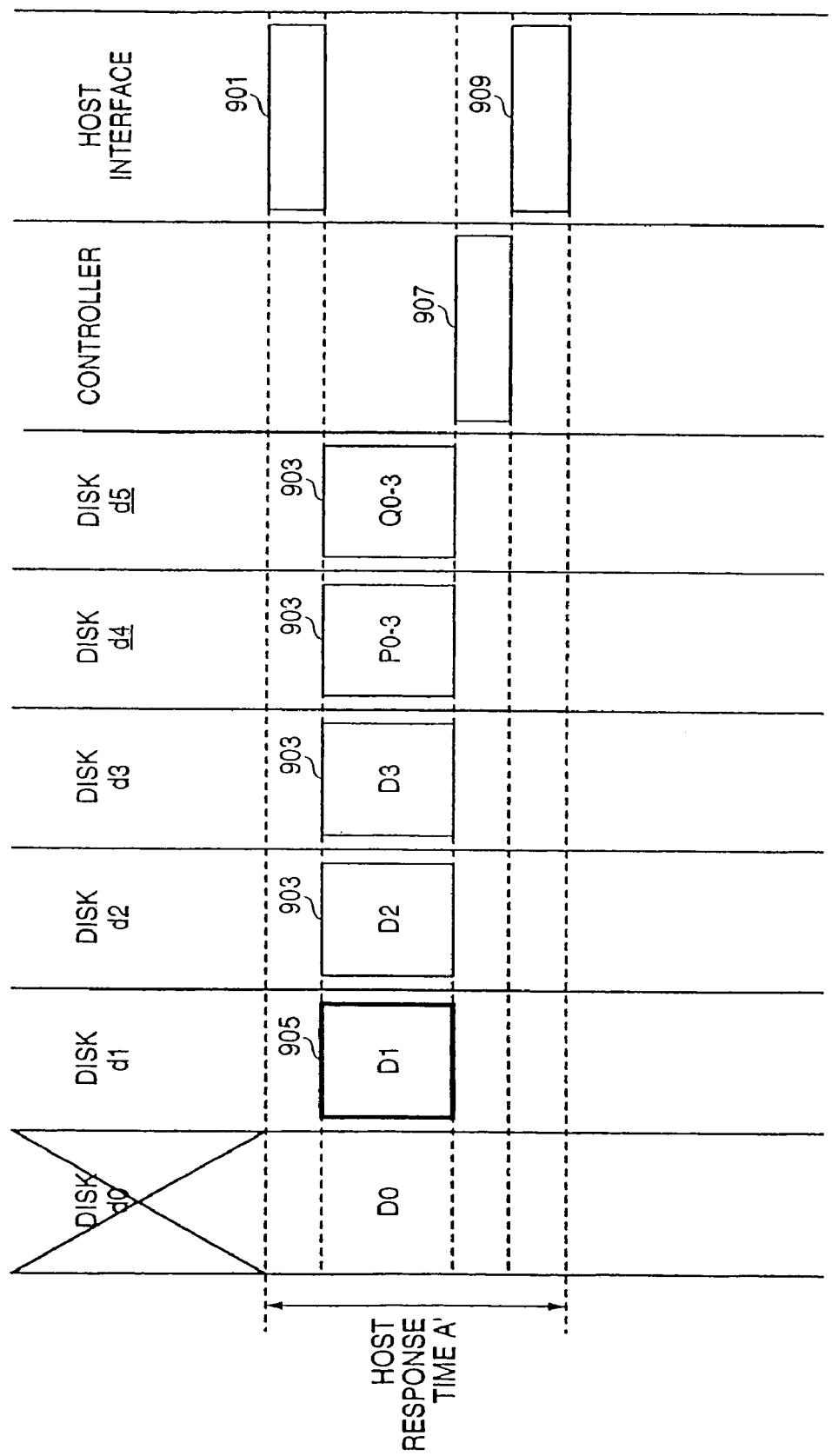
FIG. 11 is another exemplary timechart showing a host response time in the storage system of the embodiment.

By referring to FIG. 11, described next is the host response time of a case where the reading redundancy of the LU0 is set to 1 in the storage system 101 of the present embodiment. Presumably, the disk device d0 is in failure, and is known.

When a request comes from the host computer 100 for the data of the stripe D0 in the LU0, the host interface 102 and the controller 110 responsively go through a reception process for the duration of time 901 in a similar manner to the above. The controller 110 refers to the read disk management table 127 to see which disk device(s) are to be subjected to data reading, and then executes a reading process against thus found target disk devices. Herein, presumably, it is known that the disk device d0 is failed among others d0 to d5 structuring the LU0, and thus when the reading redundancy is 1, the target disk devices are d1, d2, d3, d4, and d5. Accordingly, the controller 110 applies the reading process to these disk devices d1 to d5 but not to the disk device d0. The reading process takes the time 905 for the disk device d1, and the time 903 for the disk devices d2 to d5.

If no more failure occurs to the target disk devices d1 to d5, after the reading process is through, the cache memory 121 will include the data D1, D2, D3, P0-3, and Q0-3. Among these data, the controller 110 takes the time 907 to recover the data of the stripe D0 in the not-yet-read disk device d0 using the data D1, D2, D3, and P0-3. Thus recovered data is stored into the cache memory 121. The controller 110 and the host interface 102 forward the requested data to the host computer 100 for the duration of time 909. In this case, no failure is occurring to the disk device d1, and thus the time 905 will be the same as the time 903.

Further, if the disk device d1 among the target disk devices d1 to d5 is newly failed, it means that no data is available from the disk device d1 for reading. Thus, the cache memory 121 stores the data D2, D3, P0-3, and Q0-3, and using thus stored data, the controller 110 recovers the data of the stripe D0 stored in the not-yet-read disk device d0 for the duration of time 907. The resulting data is then stored into the cache memory 121. The controller 110 and the host interface 102 forward the requested data to the host computer 100 for the duration of time 909.

As a result, a response time A' against the data request from the host computer 100 will be, similarly to the case of FIG. 10, the sum of the reception process time 901, the reading process time 905 or 903 (whichever longer), the recovery time 907, and the transfer time 909.

As such, in the present embodiment, setting 1 to the reading redundancy will almost equalize the response times A and A' no matter if any disk device is newly failed at the time of data reading. This is true to the case when every disk device is previously understood as being normal (FIG. 10), or the case when one disk device is already known being in failure before data reading (FIG. 11).

Figure 12:
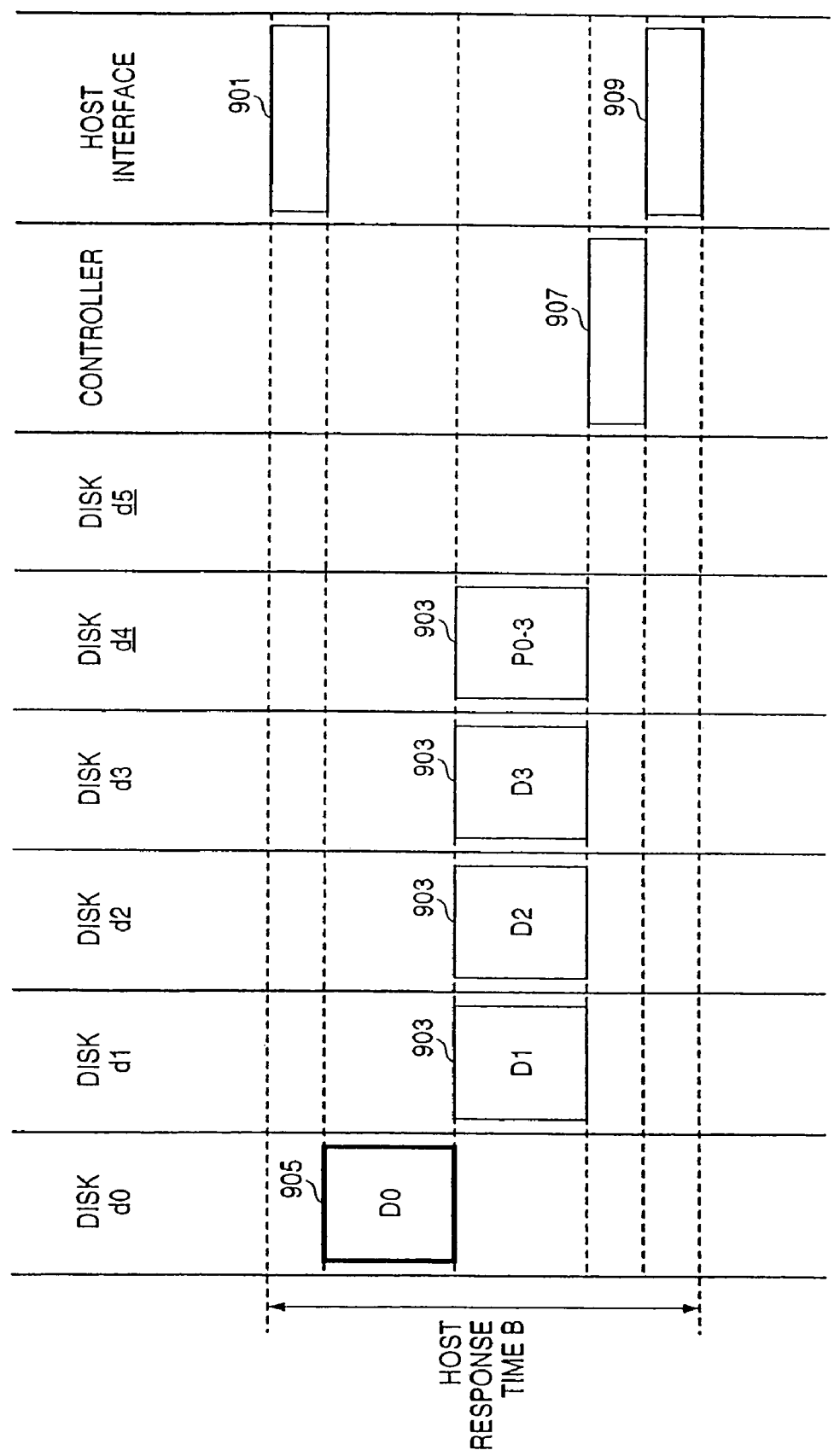
FIG. 12 is a timechart showing a host response time in a storage system utilizing the technology of Non-patent Document 2.

By referring to FIG. 12, described next is the host response time utilizing the technology of Non-patent Document 2 as a comparison purpose with the present embodiment. Herein, among the disk devices d0 to d5 structuring the LU0, described is the host response time for reading the data of the stripe D0 in the disk device d0.

When a data request comes from a host computer, a host interface and a controller go through a reception process for the duration of time 901 similarly to the above-described present embodiment. Then, the controller goes through a reading process for the duration of time 905 against the disk device d0 storing the data of the stripe D0.

At this time, if the target disk device d0 is already in failure, or if any new failure occurs thereto, the controller executes the reading process for the duration of time 903 this time against the disk devices d1, d2, d3, and d4 to recover the data of the stripe D0 stored in the disk device d0. Then, using the data D1, D2, D3, and P0-3 from the disk devices d1 to d4 to recover the data of the stripe D0 in the not-yet-read disk device d0 for the duration of time 907. The resulting data is stored into cache memory. Then, the controller and the host interface forward the requested data for the duration of time 909 against the host computer.

Accordingly, a host response time B utilizing the technology of Non-patent Document 2 will be the sum of the reception process time 901, the reading process time 905, the reading process time 903, the recovery time 907, and the transfer time 909. Compared with the host response times A and A' of FIGS. 10 and 11, the result will be longer by the reading process time 903, or by the reading process time 905.

Figure 13:
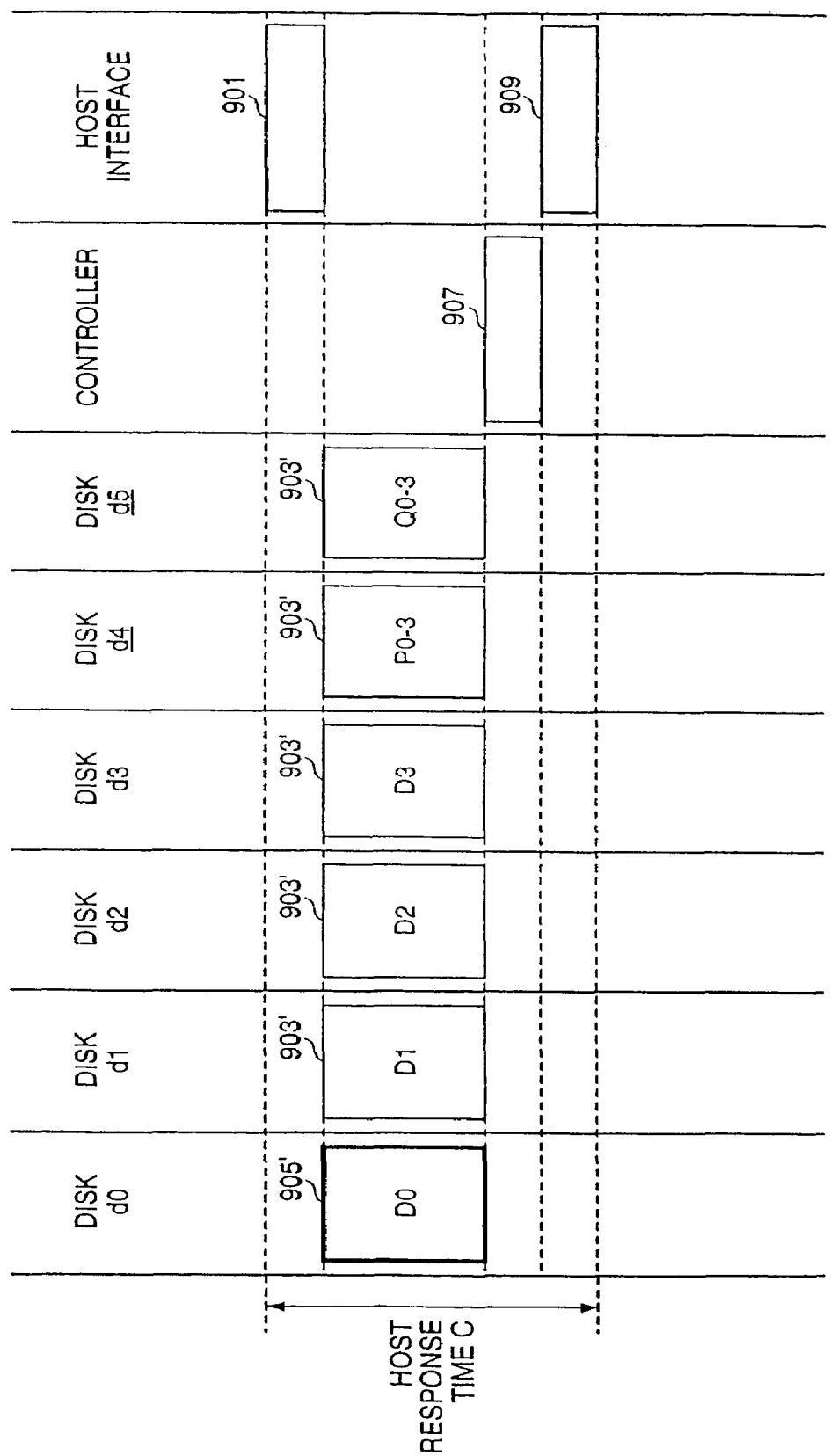
FIG. 13 is a timechart showing a host response time in a storage system utilizing the technology of Patent Document 1.

For comparison purpose, by referring to FIG. 13, a host response time utilizing the technology of Patent Document 1 is described. Described here is also the host response time at the time of reading the data of the stripe D0 stored in the disk device d0 among others structuring the LU0.

When a data request comes from a host computer for the data of the stripe D0, a host interface and a controller responsively go through a reception process for the duration of time 901 in a similar manner to the above. Then, no matter if any failure occurs to the disk device or not, the controller executes a reading process against every disk device d0 to d5 structuring the LU0 for the duration of times 905', 903', 903' . . . . If this is the case, the reading process is executed against six disk devices structuring the LU0, and thus the disk devices for data reading are increased in number than the examples of FIGS. 10 to 12. Moreover, the data transfer path is jammed to a greater degree, and the load of the storage process into the cache memory is increased, thereby resulting in the longer reading time.

If the disk device d0 is failed, by going through the above reading process, cache memory stores the data D1, D2, D3, P0-3, and Q0-3, and using thus stored data, the controller recovers the data of the stripe D0 stored in the not-yet-read disk device d0 for the duration of time 907 for storage into the cache memory. The controller and the host interface forward the requested data to the host computer for the duration of time 909.

As a result, a response time C of utilizing the technology of Patent Document 1 will be the sum of the reception process time 901, the reading process time 905' or 903' (whichever longer), the recovery time 907, and the transfer time 909. As described above, the reading process time takes longer than the above examples, resulting in longer host response times than the host response times A and A' of the examples of FIGS. 10 and 11.

What is claimed is:

1. A storage system adapted to be coupled to a host computer, the storage comprising:
   a plurality of disks storing data to be accessed and redundant data for recovering the data if necessary;
   a cache memory for temporarily storing the data;
   a controller for performing data reading from the plurality of disks and storing the read data into the cache memory before transferring the read data to the computer, wherein
   in response to a read request from the computer, the controller determines a number of the plurality of disks to be subjected to reading of the redundant data indicating a number of the disks allowed to fail for data recovery, and reads data from the plurality of disks and reads the redundant data from the determined number of disks and stores the read data and the read redundant data in the cache memory.

2. A storage system according to claim 1, further comprising:
a device state management table for storing information that indicates an extent to which the plurality of disks are available for data reading, and wherein
the controller determines how many of the plurality of disks are available for data reading, stores an indication of that result to the device state management table, and based on the result determines how many of the disks are to be subjected to reading of the redundant data.

3. A storage system according to claim 2, further comprising:
a corresponding redundancy table for storing information that indicates how many of the disks are allowed to be in a failed condition based on the information in the device state management table, and wherein
based on the number of disks not available for data reading and the information stored in the corresponding redundancy table, the controller determines how many of the disks are to be used for reading of the redundant data.

4. A storage system according to claim 3, further comprising:
a maximum redundancy table for storing a maximum redundancy that indicates how many of the disks, at a maximum, are allowed to be failed, wherein
for reading of the redundant data, the controller uses a number of disks no larger than the maximum redundancy.

5. A storage system comprising:
a plurality of disks storing data to be accessed by a computer and redundant data for recovering the data;
a cache memory for temporarily storing the data;
a controller for reading data from the plurality of disks for storage into the cache memory before transferring the data to the computer, wherein
the controller performs
a redundancy determination to determine a number of disks storing redundant data representing a number of the disks allowed to fail for data recovery, if any, is to be provided, in accordance with a predetermined factor, and
a reading operation, in response to a data request coming from the computer, of reading data and the redundant data from any of the plurality of disks and the number of disks storing redundant data determined in the redundancy determination, and stores the resulting data in the cache memory.

6. A storage system according to claim 5, further comprising:
a device state management table for storing information that indicates whether the plurality of disks are all available for data reading;
the controller performs a device state determination to determine how many of the plurality of disks are available for data reading, and stores a determination result to a device state management table, and
in the redundancy determination, a determination is made of how many of the disks having redundant data are to be read based on the device state management table.

7. A storage system according to claim 6, wherein the controller performs a redundant data selection to select the number of disks having redundant data determined in the redundancy determination in accordance with a predetermined factor.

8. A storage system according to claim 7, wherein the predetermined factor is used to make a selection precedence regarding low calculation complexity of data recovery.

9. A storage system according to claim 7, wherein the predetermined factor is used for selection of the redundant data based on a usage of a data transfer path between the disks and the cache memory.

10. A storage system according to claim 7, wherein the predetermined factor is used for selection of the redundant data based on an instruction received by the controller regarding which redundant data is to be read.

11. A storage system according to claim 5, wherein the controller executes the redundancy determination with timing satisfying at least a requirement of when data writing or reading is to be completed, when any failure occurs to the storage system, when power is turned on, and when a data request comes from the computer.

12. A method of reading data in a storage system having a plurality of disks each storing data to be accessed by a computer and redundant data used for recovering the data, a cache memory for temporarily storing the data in the plurality of disks, and a controller for reading the data from the plurality of disks for storage into the cache memory before transferring the data to the computer, the method comprising:
determining an actual reading redundancy indicating how many of the disks are allowed to be failed for data recovery in accordance with a predetermined factor, and in response determining how many of the disks having redundant data are to be provided;
reading data requested by a read request from any of the plurality of disks and the number of disks of redundant data determined in determining the actual reading redundancy, for storing the requested data into the cache memory;
when the data requested by the read request is not stored in the cache memory, recovering the requested data using the redundant data stored in the cache memory, and storing the recovered requested data into the cache memory; and
transferring the requested data stored in the cache memory to the computer.

13. A data reading method according to claim 12, further comprising:
determining whether the plurality of disks are all available for data reading, and, in response, storing a determination result to a device state management table; and wherein
in determining the actual reading redundancy, the actual reading redundancy is determined based on how many of the disks are not available for data reading as stored in the device state management table.

14. A data reading method according to claim 13, further comprising:
storing, into a corresponding redundancy table, a reading redundancy indicating how many of the disks are still allowed to be in a failed condition for data recovery based on information stored in the device state management table; and wherein
in determining the actual reading redundancy, the actual reading redundancy is determined based on the reading redundancy stored in the corresponding redundancy table, and the number of disks not available for data reading as stored in the device state management table.

15. A data reading method according to claim 12, further comprising selecting the number of disks of redundant data determined in determining the actual reading redundancy in accordance with a predetermined factor.

16. A computer program stored on a computer readable medium to be executed in a storage system, the storage system having a plurality of disks each storing data to be accessed by a computer and redundant data used for recovering the data, a cache memory for temporarily storing the data in the plurality of disks and a controller for performing data reading from the plurality of disks for storage into the cache memory before transferring the data to the computer, wherein the computer program comprises:
   redundancy determination code for determining an actual reading redundancy indicative of how many of the disks are allowed to be failed for data recovery in accordance with a predetermined factor, and corresponding to the actual reading redundancy, determining how many of the disks having redundant data are to be provided;
   data reading code for, in response to a read request from the computer, reading data from any of the plurality of disks and from disks having redundant data determined by the redundancy determination code;
   data recovery code for, when the data requested by the computer is not stored in the cache memory, recovering the requested data using the redundant data stored in the cache memory, and storing the recovered requested data to the cache memory; and
   data transfer code for transferring the requested data stored in the cache memory to the computer.

17. A computer program according to claim 16, further comprising:
   device state determination code for determining whether the plurality of disks are all available for data reading, and storing a results of that determination in a device state management table; and wherein
   the redundancy determination code determines the actual reading redundancy based on how many of the disks are not available for data reading as stored in the device state management table.

18. A computer program according to claim 17, further comprising:
   corresponding redundancy storage code for storing, into a corresponding redundancy table, a reading redundancy to indicate how many of the disks are allowed to be failed for data recovery based on information stored in the device state management table; and wherein
   the redundancy determination code determines the actual reading redundancy based on the reading redundancy stored in the corresponding redundancy table, and the number of disks not available for data reading stored in the device state management table.

19. A computer program according to claim 16, further comprising redundant data selection code for selecting, in accordance with a predetermined factor, redundant data for the number determined by the redundancy determination code.

20. A storage system adapted to be coupled to a host computer, the storage comprising:
   a plurality of disks storing data to be accessed and redundant data for recovering the data if necessary;
   a cache memory for temporarily storing the data;
   a controller for performing data reading from the plurality of disks and storing the read data into the cache memory before transferring the read data to the computer;
   a device state management table for storing information that indicates an extent to which the plurality of disks are available for data reading, and
   a corresponding redundancy table for storing information that indicates how many of the disks are allowed to be in a failed condition based on the information in the device state management table;
   wherein, in response to a request from the computer, the controller determines how many of the plurality of disks are to be subjected to reading of the redundant data, and reads data from the plurality of disks and reads the redundant data from the determined number of disks and stores the read data and the read redundant data in the cache memory;
   wherein the controller determines how many of the plurality of disks are available for data reading, stores an indication of that result to the device state management table, and based on the result determines how many of the disks are to be subjected to reading of the redundant data; and
   wherein based on the number of disks not available for data reading and the information stored in the corresponding redundancy table, the controller determines how many of the disks are to be used for reading of the redundant data.

21. A storage system according to claim 20, further comprising:
   a maximum redundancy table for storing a maximum redundancy that indicates how many of the disks, at a maximum, are allowed to be failed, wherein
   for reading of the redundant data, the controller uses a number of disks no larger than the maximum redundancy.

22. A storage system comprising:
   a plurality of disks storing data to be accessed by a computer and redundant data for recovering the data;
   a cache memory for temporarily storing the data;
   a controller for reading data from the plurality of disks for storage into the cache memory before transferring the data to the computer; and
   a device state management table for storing information that indicates whether the plurality of disks are all available for data reading;
   wherein the controller performs
     a redundancy determination to determine how many of disks storing redundant data, if any, is to be provided, in accordance with a predetermined factor, and
     a reading operation, in response to a data request coming from the computer, of reading data from any of the plurality of disks and the number of disks storing redundant data determined in the redundancy determination, and stores the resulting data in the cache memory;
     a device state determination to determine how many of the plurality of disks are available for data reading, and stores a determination result to a device state management table;
     in the redundancy determination, a determination is made of how many of the disks having redundant data are to be read based on the device state management table; and
     a redundant data selection to select the number of disks having redundant data determined in the redundancy determination in accordance with a predetermined factor; and wherein the predetermined factor is used for selection of the redundant data based on a usage of a data transfer path between the disks and the cache memory.

23. A storage system comprising:
a plurality of disks storing data to be accessed by a computer and redundant data for recovering the data;
a cache memory for temporarily storing the data;
a controller for reading data from the plurality of disks for storage into the cache memory before transferring the data to the computer; and
a device state management table for storing information that indicates whether the plurality of disks are all available for data reading;
wherein the controller performs
    a redundancy determination to determine how many of disks storing redundant data, if any, is to be provided, in accordance with a predetermined factor, and
    a reading operation, in response to a data request coming from the computer, of reading data from any of the plurality of disks and the number of disks storing redundant data determined in the redundancy determination, and stores the resulting data in the cache memory;
    a device state determination to determine how many of the plurality of disks are available for data reading, and stores a determination result to a device state management table;
    in the redundancy determination, a determination is made of how many of the disks having redundant data are to be read based on the device state management table; and
    a redundant data selection to select the number of disks having redundant data determined in the redundancy determination in accordance with a predetermined factor; and
wherein the predetermined factor is used for selection of the redundant data based on an instruction received by the controller regarding which redundant data is to be read.

24. A storage system comprising:
a plurality of disks storing data to be accessed by a computer and redundant data for recovering the data;
a cache memory for temporarily storing the data; and
a controller for reading data from the plurality of disks for storage into the cache memory before transferring the data to the computer;
wherein the controller performs
    a redundancy determination to determine how many of disks storing redundant data, if any, is to be provided, in accordance with a predetermined factor, and
    a reading operation, in response to a data request coming from the computer, of reading data from any of the plurality of disks and the number of disks storing redundant data determined in the redundancy determination, and stores the resulting data in the cache memory; and
wherein the controller executes the redundancy determination with timing satisfying at least a requirement of when data writing or reading is to be completed, when any failure occurs to the storage system, when power is turned on, and when a data request comes from the computer.

25. A storage system comprising:
a plurality of disks storing data to be accessed by a computer and redundant data for recovering the data;
a cache memory for temporarily storing the data;
a controller for reading data from the plurality of disks for storage into the cache memory before transferring the data to the computer; and
a device state management table for storing information that indicates whether the plurality of disks are all available for data reading;
wherein the controller performs
    a redundancy determination to determination to determine how many of disks storing redundant data, if any, is to be provided, in accordance with a predetermined factor;
    a reading operation, in response to a data request coming from the computer, of reading data from any of the plurality of disks and the number of disks storing redundant data determined in the redundancy determination, and storing the resulting data in the cache memory;
    a device state determination to determine how many of the plurality of disks are available for data reading, and storing a determination result to a device state management table;
    wherein in the redundancy determination, a determination is made of how many of the disks having redundant data are to be read based on the device state management table;
    a redundant data selection to select the number of disks having redundant data determined in the redundancy determination in accordance with a predetermined factor; and
wherein the predetermined factor is used to make a selection precedence regarding low calculation complexity of data recovery.

* * * * *